US012292070B2

(12) United States Patent
Bentrim et al.

(10) Patent No.: US 12,292,070 B2
(45) Date of Patent: *May 6, 2025

(54) LOCKING SNAP-IN FASTENERS

(71) Applicant: Penn Engineering & Manufacturing Corp., Danboro, PA (US)

(72) Inventors: Brian Bentrim, Furlong, PA (US); Anthony Colosi, Quakertown, PA (US); Nicholas Marshall, Sanger, CA (US)

(73) Assignee: Penn Engineering & Manufacturing Corp., Danboro, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/392,192

(22) Filed: Dec. 21, 2023

(65) Prior Publication Data

US 2024/0125342 A1    Apr. 18, 2024

Related U.S. Application Data

(62) Division of application No. 17/735,689, filed on May 3, 2022, now Pat. No. 11,873,853.

(60) Provisional application No. 63/185,002, filed on May 6, 2021.

(51) Int. Cl.
   *F16B 21/06*    (2006.01)
(52) U.S. Cl.
   CPC .................................. *F16B 21/065* (2013.01)
(58) Field of Classification Search
   CPC ................ F16B 2200/83; F16B 21/065; F16B 2001/0035
   See application file for complete search history.

(56) References Cited

U.S. PATENT DOCUMENTS

| | | | | |
|---|---|---|---|---|
| 5,651,632 A * | 7/1997 | Gordon | .................... | F16B 21/06 |
| | | | | 411/338 |
| 9,482,255 B2 * | 11/2016 | Changsrivong | ....... | F16B 21/186 |
| 9,882,332 B2 * | 1/2018 | Frederick | ............... | H01R 43/26 |
| 10,653,021 B2 * | 5/2020 | Kim | ........................ | G09F 9/3026 |
| 10,918,572 B2 * | 2/2021 | Sanchez | ..................... | A61J 1/10 |
| 11,401,966 B2 * | 8/2022 | Wang | ...................... | F16B 33/00 |
| 11,441,595 B2 * | 9/2022 | Wang | ................... | H05K 3/0058 |
| 11,454,341 B2 * | 9/2022 | Liu | ........................ | F16L 37/004 |
| 11,498,166 B2 * | 11/2022 | Maloney | ................. | B21J 15/02 |
| 2004/0003487 A1 * | 1/2004 | Reiter | ..................... | A41F 1/002 |
| | | | | 24/303 |
| 2010/0308605 A1 * | 12/2010 | Fiedler | .................. | E05B 47/004 |
| | | | | 292/251.5 |

(Continued)

*Primary Examiner* — Jason W San
*Assistant Examiner* — Louis A Mercado
(74) *Attorney, Agent, or Firm* — Gregory J. Gore, Esq.

(57) ABSTRACT

A fastener assembly for releasable interconnecting two objects includes a retainer having a top end for attaching the retainer to a first object and an end wall at the bottom end having an aperture. A post affixed to a second object at its bottom end is captured within a central cavity of the retainer by resilient snap fit wherein either the post or the retainer is radially deflectable. A locking element slidably connected to the retainer is axially moveable between locked and unlocked positions operative to restrict the relative radial movement of the post and the retainer to prevent the removal of the post. The locking element maybe a pin moved by a magnet and extendable into a bore of the post by a spring. Alternatively, the locking element may be a sleeve closely fitted around the outside of the retainer.

13 Claims, 4 Drawing Sheets

(56) References Cited

U.S. PATENT DOCUMENTS

2016/0032952 A1\* 2/2016 McBroom ............... G06F 1/181
  24/303
2017/0059967 A1\* 3/2017 Harrison ................ F16M 13/00
2018/0010330 A1\* 1/2018 Hamilton .............. E04B 1/6803

\* cited by examiner

LOCKING SNAP-IN FASTENERS

RELATED APPLICATIONS

This is a divisional patent application based on U.S. patent application Ser. No. 17/735,689 filed May 3, 2022, now U.S. Pat. No. 11,873,853 issued Jan. 16, 2024, which is a non-provisional patent application based upon U.S. provisional patent application 63/185,002 entitled, "Magnetic Snap-In Fasteners" filed May 6, 2021 priority from which is hereby claimed.

FIELD OF THE INVENTION

This patent application relates to fastening systems which join two components together by snap-fit. More specifically it relates to fasteners and fastening systems which can be magnetically actuated.

BACKGROUND OF THE INVENTION

There are currently fasteners on the market that allow for parts to snap together and snap off. However, the present fastener improves on the current products since it allows the fastener to be locked in place, preventing removal. The locking mechanism prevents accidental removal without the proper removal tooling.

SUMMARY OF THE INVENTION

One embodiment of the improved fastening system disclosed herein comprises an attachment method utilizing a bulbed post with a slot, and a retainer that snaps and locks onto the post. The retainer includes an internal mechanism that is spring loaded such that it is biased to press into the slot of the bulbed post. The fastener assembly can be easily pressed together but cannot be removed without withdrawing the locking element. A magnetic tool can withdraw the locking element, allowing the fastener to snap apart and be removed. Both sections of the fastener can be installed into a blind hole through various means of attachment.

There are at least two possible configurations for this fastening system which are shown and described below. Both utilize the same operational functionality. That is, two parts snap together and then a locking component is forced into position by a spring. The fastener is then locked into position until a magnet tool is used to retract the locking component. The parts are then able to be pulled apart against a residual clamp force with minimal effort.

More specifically, the applicant has devised a fastener assembly for releasable interconnecting two objects, comprising a retainer having a top and a bottom end with means at the top end for attaching the retainer to a first object and an end wall at the bottom end having an aperture. An internal retainer cavity is located the between the top and bottom ends of the retainer. A post affixed to a second object at its bottom end is captured in the retainer by resilient snap fit whereby the post or the retainer is radially deflectable. A captured portion of the post is resiliently received through the retainer aperture.

The post has a bulb at a top end and at least one diametric slot between at least one opposing pair of resilient arms which are inwardly deflectable. The post also has a neck of reduced diameter adjacent a trailing end of the bulb and a flange located immediately below the neck. When assembled the trailing end of the post bulb is in abutment with an internal rim of the retainer end wall while the post flange abuts the bottom end of the retainer.

A locking element is axially moveable between an extended locked position and an unlocked retracted position which is operative to restrict the relative radial movement of the post and the retainer sufficiently to prevent the removal of the captured post portion from the retainer when the locking element is in the extended and locked position. A spring is operative between the locking element and the retainer which biases the locking element in the extended position. The captured portion of the post is preferably the bulb having tapered leading and trailing ends that is radially compressible such that its diameter is reduced as its sides are forced into the retainer aperture. The locking element is a pin dimensioned to be freely received into an axial bore of the post. The locking element can be composed of a material attracted by magnetism such that the locking element can be moved from the locked to the unlocked position by the force of magnetic attraction. The pin has a lead-in chamfer on its bottom end and the post has a complimentary concave chamfer around its top end to guide the passage of the pin into the post bore.

In another embodiment the post is solid and non-compressible and the retainer has resilient sides that are outwardly deflectable. Here, the locking element is a sleeve closely fitted around the outside of the retainer which prevents the outward deflection of the retainer sides when in the locked position sufficient to prohibit the removal of the post from the retainer, but which permits outward deflection of the retainer sides when in the unlocked position sufficient to allow removal of the post from the retainer. Slots in the sides of the retainer form resilient arms in between the slots. A spring is operative between the sleeve and the post to bias the sleeve upwardly toward the locked position.

Of its many advantages, this fastener assembly allows for an acceptable cosmetic appearance in assembled clam shell applications where two panels are joined. This fastener can be made where no fasteners are visible. The parts can still be removed with the use of a magnetic tool that activates an internal mechanism. The tool can be used from the outside of the device and does not require access to the inner parts of the assembly.

Other variations and advantages and other embodiments will be apparent to those of skill in the art from the following drawings and description of two possible embodiments. Many other embodiments are possible.

DESCRIPTION OF PREFERRED EMBODIMENTS

There are two are at least two embodiments of the present fastener system which are described below. Both embodiments use the same basic theory to releasably lock together two parts of an assembly. A pair of mating fasteners, each separately affixed to an external object such as a panel, releasably interconnect to attach and detach those objects. Each fastening system employs a male and a female component which can be joined by snap fit, one within the other, caused by the resilient deflection of one of the components. In one embodiment, the male part has resilient arms which can deflect inwardly and in a second embodiment the female part has resilient arms which can deflect outwardly. As will be further described below, each embodiment has a locking feature which can be controlled by magnetism to move the condition of attachment from locked to unlocked. In either embodiment a residual clamp force is maintained when in the unlocked state. The embodiments shown are circular in nature and symmetrical about a central axis but other geometric configurations are possible.

Figure 1:
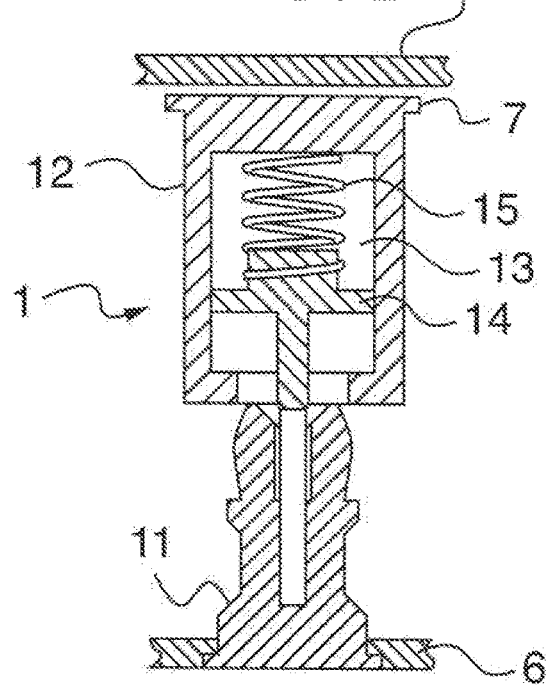
FIG. 1 is a front elevation sectional view of the fastener assembly of one embodiment of the invention.

Referring now to FIG. 1, a first embodiment uses a slotted post (11) with a bulbed section that joins to a retainer assembly having the following components: a retainer body (12) with internal recess (13), a coil spring (15), and a pin (14). The ends of the post and retainer can be affixed to objects (5) and (6) seen here as affixed by solder pad (not shown) which joins a panel (5) to the retainer (12) and a broaching connection of the post (11) to the panel (6) although other suitable means of attachment can be employed in either case.

Figure 2:
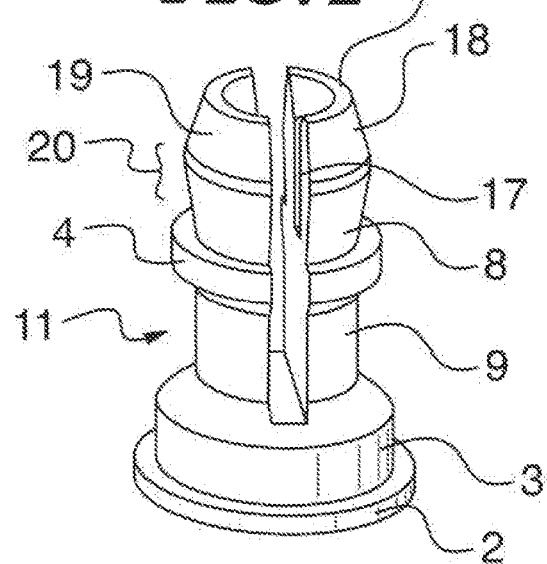
FIG. 2 is a top left front isometric view of the post component.

Referring now to FIG. 2, the post (11) of FIG. 1 is shown in isolation. It comprises a shank (9) that has a central longitudinal slot (17) which divides it into two opposing arms (18 and 19) that can flex inwardly. The slot forms an axial bore that extends downward into the slot from a top end of the post (11). The post flexure reduces the post's outside diameter so that it can be accepted into the retainer receiving hole seen in FIG. 3 and as described in further detail in FIGS. 9A-9D. The counter-sink (10) aids the locking pin in axially aligning it to its proper operating position. The shank also comprises a bulb-shaped region (20) forming a bulb with a neck (8) of reduced diameter around the bottom of the bulb. A flange (4) of greater diameter is located just below the neck (8). An enlarged base (3) at the opposite end of the post can be affixed to an external structure such as a panel through various means such as clinching, surface mount soldering, or broaching as seen in FIG. 1. It is shown here with a flange (2) for soldering, over-molding or rotary installation at the bottom of the post for attachment of the post to an object.

Figure 3:
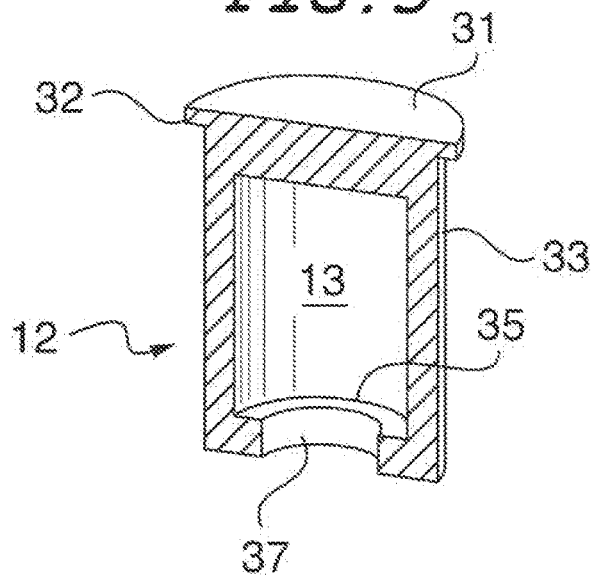
FIG. 3 is a top left front isometric sectional view of the retainer component.

Referring now to FIG. 3, the retainer of FIG. 1 is shown in isolation. The basic features are: an attachment surface (31) on the top of a body (33); a central cavity (13); and a hole (37) through a bottom surface forming a mouth for receiving the post (11) as seen in FIG. 1. The bottom surface has an internal rim (35) inside the cavity (13) which surrounds the inside of the (hole (37). Like the post, the retainer has a flange (32) at the top end that can be affixed to an external object such as a panel through various means such as clinching, broaching, or surface mount soldering. It is shown here with a flange for soldering, over-molding or rotary installation at the bottom of the post provides means for attachment of the post to an object.

Figure 4:
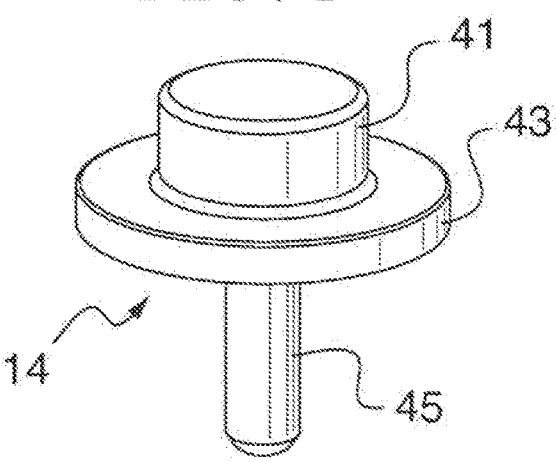
FIG. 4 is a top isometric view of the locking pin component.

Referring now to FIG. 4, the locking pin (14) component of FIG. 1 is seen in isolation. It comprises a head (41), a flange (43) of greater diameter and an elongate shank (45) extending downward from the flange to a distal bottom end. The enlarged flange (43) defines the proper installation depth and increases the contact surface area with the retainer when assembled. The head provides a centering of the coil spring (15) seen in FIG. 1. While the head (41) is optional it allows the spring to seat properly within the retainer bore. The head also prevents the spring from sliding within the retainer, tipping, or being knocked out of alignment. When in the locking position, the pin prevents the post arms from flexing inward, which could otherwise allow the retainer to be released as shown in FIGS. 9A-9D.

As described above, the fastener assembly seen in FIGS. 1-4 provides a device to releasably but rigidly interconnect two objects which is simple to use as depicted in FIG. 9. After the retainer and post components are individually affixed to the object to be connected, the post and retainer can be forced together causing the slotted post to flex inward so that the retainer hole passes over the bulbed region of the post, the retainer end wall now resting against a flange of the post. A locking pin is simultaneously forced into a central bore of the post by a spring. When the locking pin is in place the slotted post can no longer be removed from the retainer because the inward deflection of the post arms is prevented thus locking the fastener in place and holding the attached objects rigidly together in the axil direction of the fastener assembly. The pin can be removed from the slotted post with the use of a magnet or magnetic tool positioned above the retainer whereby the spring is compressed and the pin is moved upward out of the post slot bore. The post and retainer can then be disassembled and the objects separated.

A second embodiment of the invention is shown in FIGS. 5 through 8. This configuration represents a reversal of the resilient properties of the male and female parts shown in the previous embodiment to create much the same result. This configuration uses a solid rigid non-compressible post (57) with a bulbed region (54) and a flange (53) at the bottom, a slotted resilient retainer (58), a spring (59), and a locking sleeve (55). The bottom of the retainer has a hole (52) and an internal cavity (51) of increased diameter. The flanged ends of the retainer and post (50) and (53) respectfully can have suitable attachment means as seen in the previous embodiment but not shown here as unnecessary for understanding this embodiment. The main difference between this structure and previous embodiment is that the slotted resilient component is the retainer rather than the pin. Due to this difference, the locking mechanism is changed from an internal to externally applied structure. The locking sleeve achieves this same functionality in this configuration by preventing the slotted retainer from flexing outwardly and being removed. The fastener uses a spring (59) to engage the locking sleeve (55) with the slotted retainer (58). The spring (59) biases the locking sleeve (55) into position around the retainer after the two parts have been assembled. The spring force is selected so that it can be compressed by the magnetic force supplied by the magnet (100) applied to the sleeve (55) from below the fastener assembly as shown on FIG. 10D.

Figure 5:
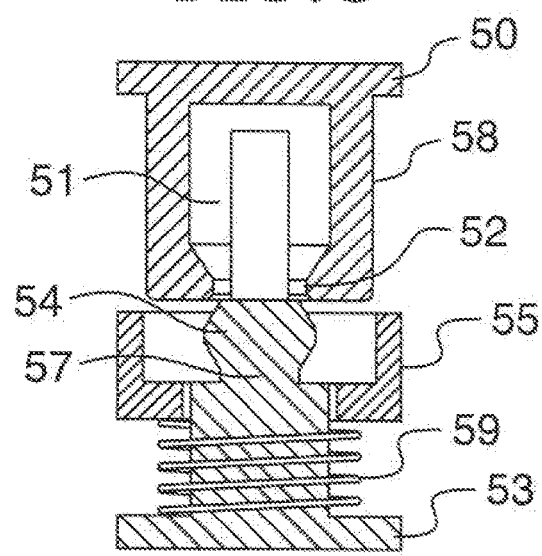
FIG. 5 is a front elevation sectional view of a second embodiment.
Figure 6:
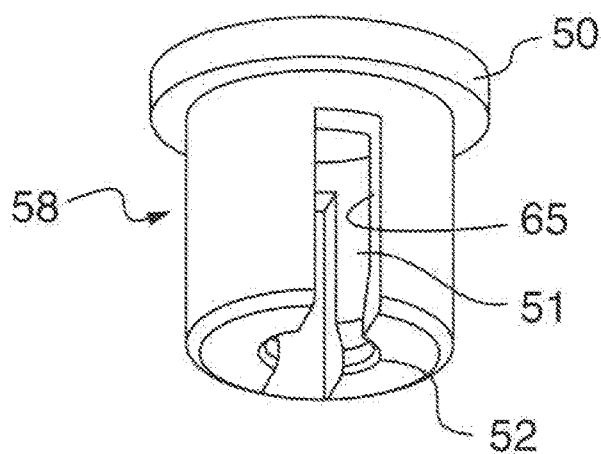
FIG. 6 is a bottom right isometric view of the retainer component of the second embodiment.
Figure 7:
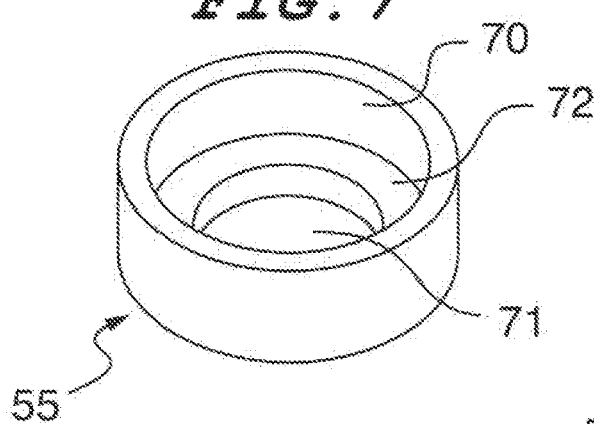
FIG. 7 is a top front isometric view of the retainer component of the second embodiment.

Referring now to FIGS. 5 and 6, the fastener assembly of FIG. 5 includes a slotted retainer shown here in isolation.

The retainer (58) joins with the above described bulbed post (57) of FIG. 5. The retainer has a longitudinal slot (65) that allows arms formed in the walls to be flexible. Thus, the retainer can be captured on the bulbed post when the internal diameter of a receiving hole (52) passes over the bulbed section (54) of the post (57) and enters the retainer cavity (51) of greater diameter. The opposing walls of the retainer (58) flex during installation without yielding. The bottom (52) of the cavity (51) is chamfered but can be flat if desired. The retainer is shown with a flange (50) to allow it to be mounted to external components installed by rotary clinching, molding, or surface mounting. Alternate retainer configurations with self-clinching, broaching, or welding features are also possible Referring now to FIG. 7, this embodiment of the fastening system utilizes a rigid sleeve (55) to lock the fastener components together after assembly. The sleeve has an internal bore (70) that is sized to closely fit around the outside of the slotted retainer seen in FIG. 6. When in the locking position the inner wall of the sleeve prevents the slotted retainer arms from expanding outwardly and thus the post from being removed from the retainer. The end wall of the sleeve has a hole (71) to allow passage of the post through the sleeve when the post is flexed inwardly so the sleeve can be retracted. The inside wall of the sleeve hole is sized to fit closely over the cylindrical sides of the post but allow it to slide axially without resistance. The bottom end wall (72) of the retainer bore provides a flat contact area for the spring (59) seen in FIG. 5.

Figure 8:
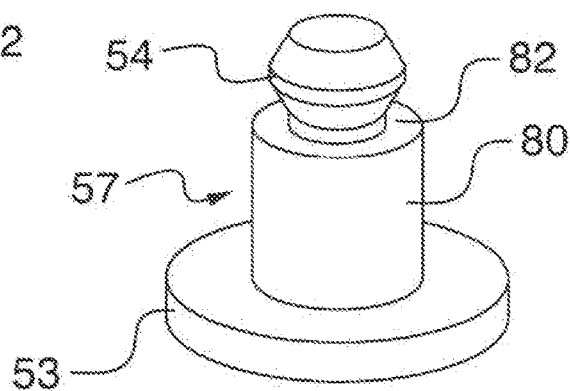
FIG. 8 is a top front isometric view of the locking sleeve component of the second embodiment.

Referring now to FIG. 8, the second fastener embodiment utilizes a rigid post (57) with a bulbed region (54). The bulbed region captures the retainer as described above and holds the assembled fastener male and female halves together. A flat top surface (82) of the post shank (80) defines the correct assembled insertion depth and allows for stabilizing contact surface area of the post when assembled with the retainer. The length of the post shank (80) is variable depending on the desired total length of the fastening system. The post is shown with a flange (53) at its base that is useful for installing the post into sheet metal, plastic, or other chassis by rotary installation or molding. It can alternatively be utilized with a self-clinching feature, broaching feature, or other attachment method as in the previous embodiment.

FIGS. 9A through 9D depict the operation sequence of the fastener assembly of FIG. 1 proceeding from left to right. This is achieved by a applying a pressing force of the post component against and then into the retainer. In a first disconnected position shown in left most illustration 9A, the post and retainer are placed in axial alignment with bulb region of the post positioned against the mouth of the retainer hole.

Figure 9A:
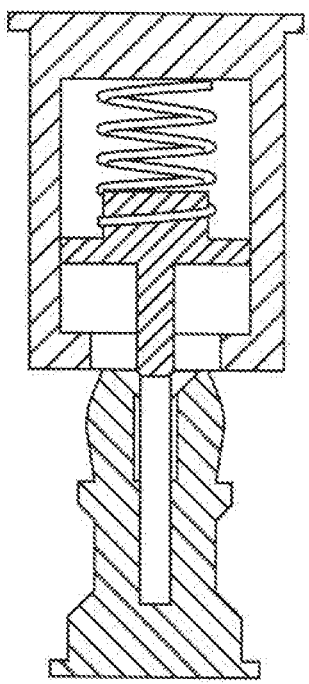
FIGS. 9A through 9D depict a series of front elevation sectional views showing an operational sequence of the invention shown in FIG. 1.
Figure 9B:
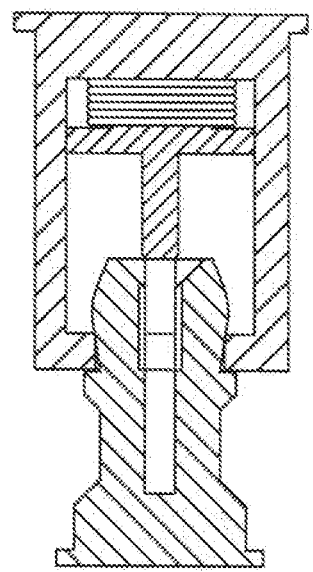

In the next illustration to the right FIG. 9B, as the post and retainer are pressed together a chamfer at the top of the post bulb region acting against the end wall of the retainer causes the post shank to flex inwardly, reducing its diameter and permitting entry into the retainer central cavity. During the movement of the post into the retainer the pin is pushed upwardly against spring by the end of the post of reduced diameter.

Figure 9C:
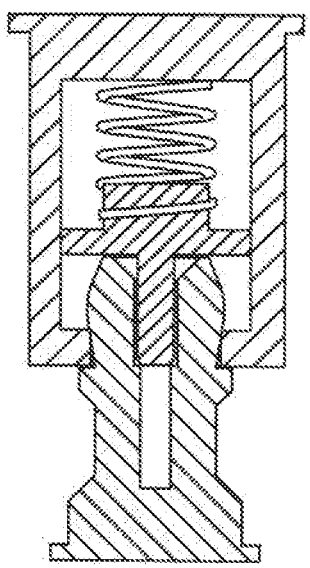

As shown in FIG. 9C, movement of the post into the retainer is stopped by abutment of the post flange against the bottom end wall of the retainer. In this position the bulb of the post resides entirely within the retainer cavity and the neck of the post shank abuts the internal rim of the retainer end wall. This creates an overlap fit with the internal rim of the retainer end wall and the post bulb. The arms of the post are designed such that during installation they will flex inward to accept the retainer. As the post bulb enters the retainer cavity the inwardly compressive force against the post shank is released and the arms of the post open to their free state which then accepts the insertion of the pin into the central bore between the arms of the post by force of the spring or in some cases by the force of gravity without using the spring. This is the locked position of the fastener assembly. The interposition of the pin will not allow the post arms flex inwardly when an attempt is made to separate the post and retainer by moving the post in the opposite direction of disengagement.

Figure 9D:
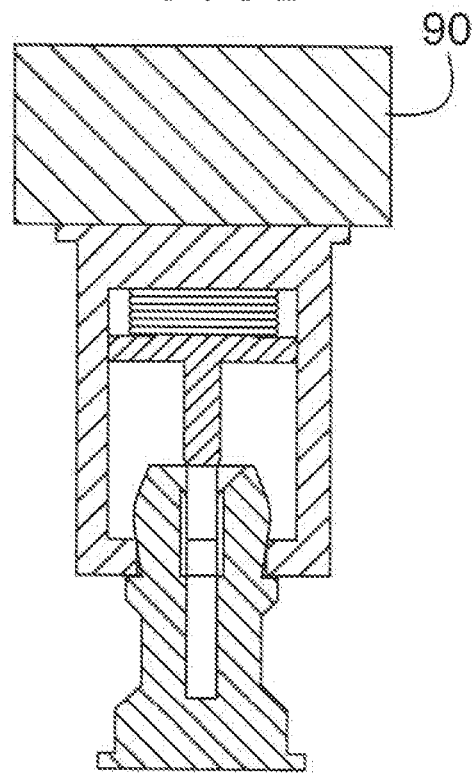

As seen now in FIG. 9D, the fastener can be changed from the locked to an unlocked condition by moving the pin upwardly out of the post bore against the pressure of spring. This can be done in this embodiment by placing a magnet (90) against the top end of the retainer such as against the opposite side of the attached object as seen here. With the pin removed from the post, the post bulb applies a residual clamp force holding the post into the retainer but that force can be non-destructively overcome by pulling the post away from the retainer. This is now possible since the post arms are free to flex inwardly as the bulb passes out through the hole in the end wall of the retainer. In this unlocked condition the objects attached to the ends of the fastener assembly remain attached by resilient snap-fit but are easily releasable.

Referring now to FIGS. 10A through 10D, the operational sequence of the second embodiment of the invention seen in FIG. 5 is shown in the same way as those shown in FIGS. 9A though 9D. Proceeding from left to right, we see in FIG. 10A the post and sleeve assembly is first placed in axial alignment with the retainer.

Figure 10A:
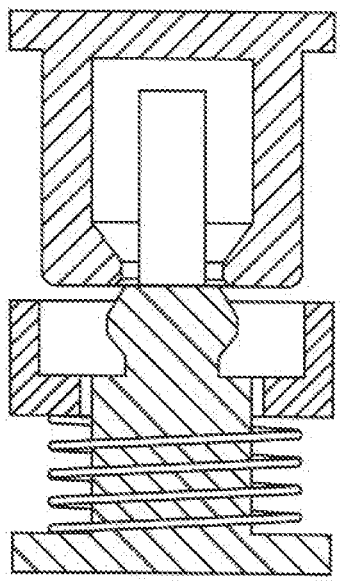
FIGS. 10A through 10D depict a series of front elevation sectional views showing the operational sequence of the second embodiment shown in FIG. 5.
Figure 10B:
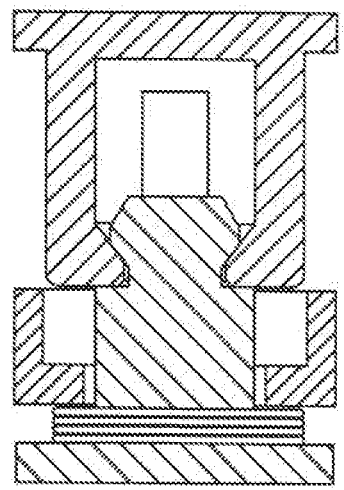

Next, in FIG. 10B the post has been inserted into the retainer. The retainer receiving hole is smaller in diameter than the bulb portion of the post but passage into the retainer is permitted by the outward flexure of the retainer walls. Now, the bulb portion of the post occupies the retainer cavity. Insertion depth is stopped by abutment of the top surface of the post shank with the bottom of the retainer.

Figure 10C:
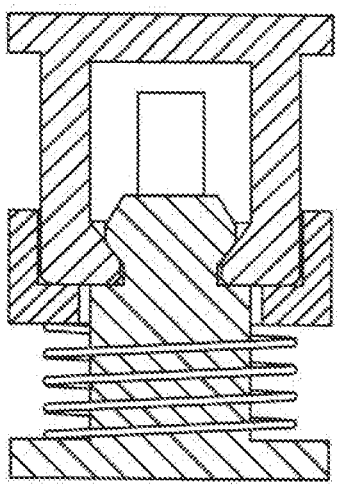

Then, as seen in FIG. 10C, the sleeve is force upwardly around the retainer outer wall by the spring operating between the base of the post and the sleeve or in some cases by the force of gravity by inverting the assembly if the spring is not used. This is the locked position of the assembly where the sleeve prevents the outward flexure of the retainer walls that would allow retraction of the post bulb back through the retainer hole.

Figure 10D:
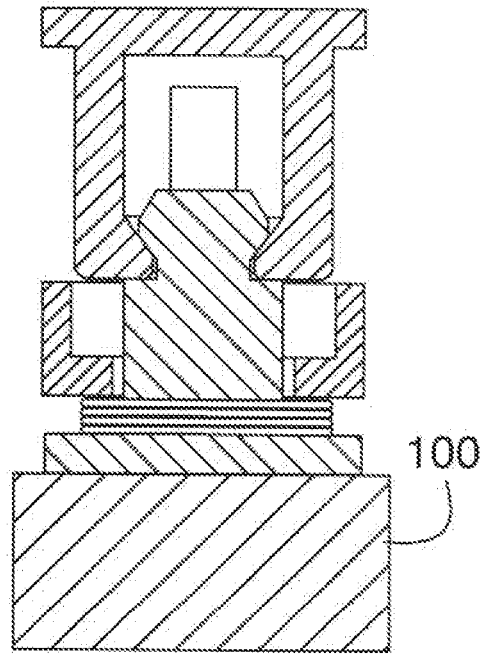

FIG. 10D shows how the assembly can be unlocked by use of magnet 100 placed against the base of the post. Magnetic attraction of the sleeve pulls the sleeve downward away from the retainer. This allows the outward flexure of the retainer walls so that the bulbed portion of the post can be pulled through the expandable retainer hole.

While specific embodiments have been described it should be understood that the invention is not to be limited to these embodiments. For example, the invention may utilize different materials and be composed of different geometric shapes and dimensions. There are variations and adaptations that are possible without departing from the scope of the invention which is to be determined only by the following claims and their legal equivalents.

What is claimed is:

1. A fastener assembly for releasable interconnecting two objects, comprising:

a retainer having a top end and a bottom end with means at the top end for attaching the retainer to a first object and an end wall at the bottom end having an aperture;

a cavity within the retainer located between the top and bottom ends of the retainer;

a post affixed to the retainer by resilient snap fit whereby the post or the retainer is radially deflectable, said post having a captured portion resiliently received through said aperture and residing within said cavity, said post further having a bottom end with means for attachment of the post to a second object;

a locking element slidably connected to the post and unrestrictedly axially moveable between an extended locked position and a retracted unlocked position and being operative to restrict the relative radial movement between the post and the retainer such that a removal of the captured portion from the retainer is prevented when the locking element is in the locked position; and a spring operative to bias the locking element toward the locking position and wherein the captured portion of the post is a bulb having tapered leading and trailing ends.

2. The device of claim 1 wherein the spring is in abutment with the locking element and the post.

3. The device of claim 1 having a first object affixed to the retainer and a second object affixed to the post.

4. The device of claim 3 wherein the objects are attached by soldering.

5. The device of claim 1 wherein the retainer and the post remain connected by a residual clamp force when the locking element is in the retracted position.

6. The device of claim 1 wherein the retainer has at least one diametric slot between at least one opposing pair of resilient arms which are outwardly deflectable.

7. The device of claim 1 wherein the post has a neck of reduced diameter adjacent the trailing end of the bulb and a flange located immediately below the neck.

8. The device of claim 7 wherein the trailing end of the bulb is in abutment with an internal rim of the end wall while the flange abuts the bottom end of the retainer.

9. The device of claim 1 wherein the locking element is composed of a material attracted by magnetism such that the locking element can be moved from the locked position to the unlocked position by a force of magnetic attraction.

10. The device of claim 1 wherein the post is solid and non-compressible.

11. A fastener assembly for releasable interconnecting two objects, comprising:

a retainer having a top end and a bottom end with means at the top end for attaching the retainer to a first object and an end wall at the bottom end having an aperture;

a cavity within the retainer located between the top and bottom ends of the retainer;

a post affixed to the retainer by resilient snap fit whereby the post or the retainer is radially deflectable, said post having a captured portion resiliently received through said aperture and residing within said cavity, said post further having a bottom end with means for attachment of the post to a second object;

a locking element slidably connected to the post and unrestrictedly axially moveable between an extended locked position and a retracted unlocked position and being operative to restrict the relative radial movement between the post and the retainer such that a removal of the captured portion from the retainer is prevented when the locking element is in the locked position; and a spring operative to bias the locking element toward the locking position wherein the retainer has resilient sides that are radially outwardly deflectable.

12. The device of claim 11 having slots in the sides of the retainer with resilient arms in between the slots.

13. A fastener assembly for releasable interconnecting two objects, comprising:

a retainer having a top end and a bottom end with means at the top end for attaching the retainer to a first object and an end wall at the bottom end having an aperture;

a cavity within the retainer located between the top and bottom ends of the retainer;

a post affixed to the retainer by resilient snap fit whereby the post or the retainer is radially deflectable, said post having a captured portion resiliently received through said aperture and residing within said cavity, said post further having a bottom end with means for attachment of the post to a second object;

a locking element slidably connected to the post and unrestrictedly axially moveable between an extended locked position and a retracted unlocked position and being operative to restrict the relative radial movement between the post and the retainer such that a removal of the captured post portion from the retainer is prevented when the locking element is in the locked position; and a spring operative to bias the locking element toward the locking position wherein the locking element is a sleeve closely fitted around an outside of the retainer which prevents an outward deflection of retainer sides when in the locked position sufficient to prohibit the removal of the post from the retainer, but which permits the outward deflection of the retainer sides when in the unlocked position sufficient to allow the removal of the post from the retainer.

* * * * *